United States Patent [19]

LaPan

[11] Patent Number: 4,681,081
[45] Date of Patent: Jul. 21, 1987

[54] SPLIT VAPOR/LIQUID FUEL SUPPLY SYSTEM FOR INTERNAL COMBUSTION ENGINES

[76] Inventor: Theodore T. LaPan, 2687 Kings Mill Dr., P.O. Box 792, Marion, Ohio 43302

[21] Appl. No.: 860,388

[22] Filed: May 6, 1986

[51] Int. Cl.$^4$ ............................................. F02M 17/22
[52] U.S. Cl. ..................................... 123/522; 123/557
[58] Field of Search ........................ 123/557, 522, 523

[56] References Cited

U.S. PATENT DOCUMENTS

| | | | |
|---|---|---|---|
| 4,267,802 | 5/1981 | Garretson | 123/523 |
| 4,270,506 | 6/1981 | Lowe | 123/523 |
| 4,368,712 | 1/1983 | Jackson et al. | 123/522 |
| 4,370,970 | 2/1983 | Kunz | 123/523 |
| 4,372,280 | 2/1983 | Adams | 123/522 |

*Primary Examiner*—E. Rollins Cross
*Attorney, Agent, or Firm*—Sughrue, Mion, Zinn, Macpeak & Seas

[57] ABSTRACT

A split vapor/liquid fuel supply system feeds liquid hydrocarbon fuel to the carburetor or its equivalent of an spark ignition internal combustion engine for ignition with air within a reciprocating piston defined combustion chamber. A partial fuel vaporizer connected intermediate of the fuel tank and the carburetor includes a housing forming underlying liquid fuel chamber, an overlying vapor expansion chamber, and a heat transfer plate separating the same in a sealed housing assembly. Varying degrees of vacuum pressure are applied within said sealed housing chamber causing ambient air to enter the air liquid chamber below the liquid fuel level within the liquid fuel chamber for percolation therethrough, passage through a perforated air distribution plate, and explosion impingement against the perforated heat transfer plate with increased production of vaporization of the liquid fuel due to the lowering of the fuel boiling point as a result of atmospheric pressure with said chamber. The vapor expands within the vapor expansion chamber mixed with some ambient air and is transferred to the air filter for increased time factor mixing of air/fuel prior to the main air stream mixing with the fuel in liquid particle form within the carburetor or its equivalent.

11 Claims, 5 Drawing Figures

SPLIT VAPOR/LIQUID FUEL SUPPLY SYSTEM FOR INTERNAL COMBUSTION ENGINES

FIELD OF THE INVENTION

This invention relates to liquid hydrocarbon fuel supply systems for spark ignition or diesel internal combustion engines and, more particularly, to the incorporation of a partial vaporizer within the system for varporization of the lighter fractions of the fuel and supplying the same to the incoming air supply to the engine prior to passage through the engine carburetor or its equivalent and the engine intake manifold.

BACKGROUND OF THE INVENTION

Standard automotive internal combustion engine carburetion systems presently in use demand that the liquid fuel (gasoline) remain in a liquid state until its release, just prior to entering the engine intake manifold. As the engine intake manifolds have means for adding excessively high temperatures to the manifold materials passing therethrough by means of exhaust gas flow, a major portion of the fuel that would normally evaporate at relatively low temperature is damaged (carbonized) by this excessively high temperature prior to entering the engine combustion chambers and is no longer of any use. Additionally, the "time" factors involved do not allow for near complete vaporization (due to flow velocities up to 300 mph) to occur from the point of release of the liquid fuel, until it enters the extremely high temperatures of the combustion chambers themselves. Mixing of the liquid hydrocarbon with combustion air is also very limited and proper combustion requires the joining of proper amount of oxygen with the fuel to burn the fuel rapidly and completely. As a result of the above, only a minor portion of the fuel presently inducted into standard fuel systems is properly utilized as power output of the internal combustion engine.

It is, therefore, a primary object of the present invention to overcome the problems inherent in standard fuel systems for internal combustion engines by partially vaporizing the light components or fractions of the liquid hydrocarbon fuel prior to entering the standard carburetor and for supplying those vaporized light components to the incoming air supply, separate from the heavier liquid fuel components in fine liquid particle form supplied at the carburetor or its equivalent to that incoming air supply.

SUMMARY OF THE INVENTION

The present invention is directed to a split vapor/liquid fuel supply system for an internal combustion engine having: an intake manifold leading to at least one combustion chamber, a fuel tank holding a liquid hydrocarbon fuel supply and connected to the carburetor for feeding the fuel thereto, and air supply means for supplying engine intake air to the carburetor for mixing with the fuel. The improvement comprises a partial fuel vaporizer connected intermediate of the fuel tank and the carburetor. The partial fuel vaporizer includes an underlying liquid fuel chamber and an overlying vapor expansion chamber, means defining an intermediate main housing and a heat transfer plate having small diameter holes or passage means therethrough. The heat transfer plate separates the vapor expansion chamber from a bubble/liquid chamber section defined by the heat transfer plate and a perforated air distribution plate. Means are provided for permitting ambient air to enter an air/liquid chamber section below the liquid fuel level therein for percolation therethrough and the perforated air distribution plate. Bubbles of air then pass through said heat transfer plate. Tube means connect the vapor expansion chamber to said air suppy means (air intake housing) of said carburetor upstream of said carburetor. Further tube means connect said liquid fuel chamber to said carburetor, whereby the light hydrocarbon fuel components, in vapor form, from the vapor expansion chamber mix with the main intake air stream prior to its passage through the carburetor providing an increased time factor of air/fuel mixing. The result is less liquid fuel is needed by the engine, the speed of the flame front is increased within the combustion chamber, greater portions of the fuel are burned in the power stroke of the engine and there is less fuel waste during the engine piston exhaust stroke.

The partial vaporizer may comprise a three-part housing including a lower liquid fuel housing, an upper vapor expansion chamber housing and a main housing or perforated heat transfer plate positioned between the upper and lower housings, all forming a vertically stacked array. Means are provided for sealing said upper and lower housings to respective faces of the heat transfer plate at their peripheries. The lower liquid fuel housing may include a float chamber separate form the liquid fuel chamber, a fuel intake line connected to the float chamber, a float valve within the chamber controlling the liquid fuel level within the float chamber and the liquid fuel chamber and a fuel feed passage within the lower housing connecting the float chamber to the liquid fuel chamber. The float is located such that the liquid fuel is maintained at a level within the lower liquid fuel housing just below the perforated heat transfer plate.

The means for feeding air to the liquid fuel chamber below the liquid fuel level comprises an air passageway opening to the interior of the liquid fuel chamber below the level of accumulated liquid fuel. A perforated air distribution plate may be mounted within said lower liquid fuel housing above the opening of the air passageway thereto and an imperforate barrier plate or mesh screen or the like loosely mounted within said liquid fuel chamber beneath said perforated air distribution plate and below the level of said air inlet to said liquid fuel chamber..As such, liquid fueld, free of air bubbles, seeps by gravity into the bottom of the liquid fuel chamber about the periphery of the imperforate barrier plate. Relatively large air bubbles percolate through the bubble/liquid chamber section of the liquid fuel chamber between the air distribution plate and the barrier plate, pass through the perforations within the perforated air distribution plate and escape from the liquid fuel above the liquid level within the air/liquid chamber section prior to passage through the perforated heat transfer plate. A vacuum relief valve may be provided within the upper housings for permitting atmospheric air to enter the vapor expansion chamber under very high engine air intake vacuum pressure conditions. Preferably, the float chamber is vented to the vapor expansion chamber. The ambient air inlet passage to the liquid fuel chamber preferably includes a check valve to prevent fuel leakage from the liquid fuel chamber through the air inlet. the upper and lower liquid fuel housings may be of conical shape to facilitate expansion of the air and vapor mixture entering the vapor expansion chamber and concentration of the liquid fuel within respective upper and lower housings. The perforated heat transfer plate preferably includes a plurality of spaced vertical holes therein passing therethrough and expanding in the direction leading from the bubble/liquid chamber section to the vapor expansion chamber. The upper and lower housings may be of thermal insulative material and the heat transfer plate formed of a high thermal conductivity metal.

DESCRIPTION OF THE PREFERRED EMBODIMENT

Figure 1:
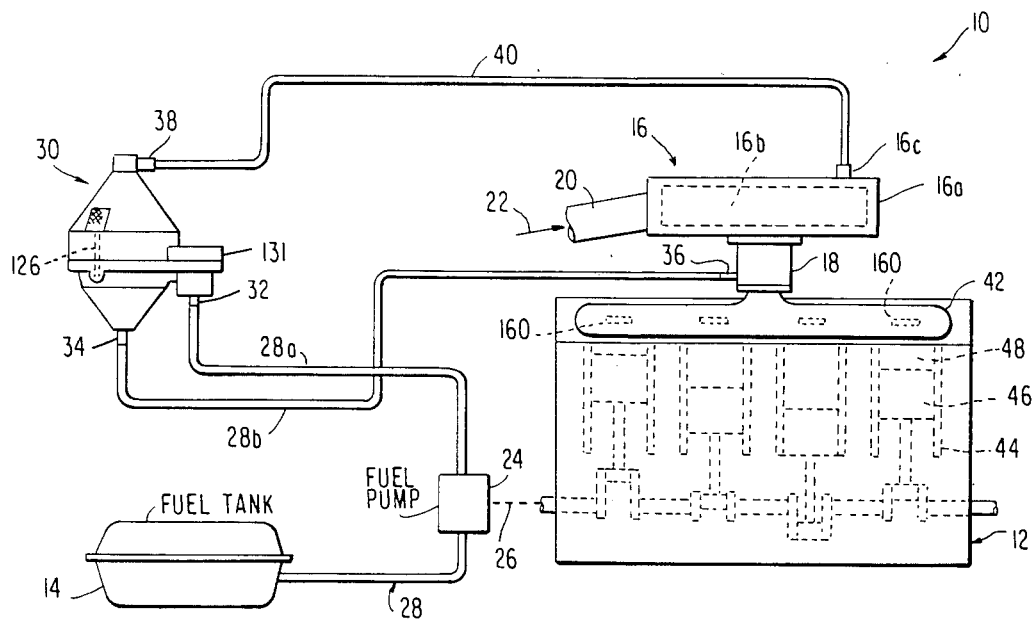
FIG. 1 is a schematic view of an internal combustion engine incorporating the split vapor/liquid fuel supply system forming a preferred embodiment of the present invention.

Turning to FIG. 1, the split vapor/liquid fuel supply system of the present invention may be incorporated within any internal combustion engine, although preferably a gasoline fueled, spark ignition-type, internal combustion engines. The system indicated generally at 10 is shown as applied to such internal combustion engine 12 which is supplied with fuel carried by a fuel tank 14. The engine includes an air filter 16 mounted to the top of the engine, and overlying the engine carburetor 18. Air enters the air filter housing 16a through an inlet tube 20 which opens to the ambient air. Ambient air enters as shown by arrow 22. Typically, a fuel pump 24 is mechanically driven by the engine 12, as at 26, and the pump 24 is connected into a fuel supply line, indicated generally at 28, leading from the tank 14.

The split vapor/liquid fuel supply system 10 of the present invention incorporates, as a primary component of the system, a partial vaporizer or device, indicated generally at 30, which is connected within the fuel supply line segment 28a via a fuel supply inlet fitting 32, opening to the partial vaporizer at its center. At the bottom of the partial vaporizer, a liquid fuel supply outlet fitting 34 connects back to a further segment 28b of the fuel supply line 28, which feeds to the carburetor 18 and is connected thereto in a conventional manner by a carburetor fuel supply connection or fitting 36. Further, the partial vaporizer includes a vapor outlet fitting 38 at the top thereof and connects via a vapor/air line or tube 40 to the air filter housing 16a such that the lighter fuel, in vapor form and mixed with some ambient air, in turn mixes with the main stream of intake air 22 prior to passage through the carburetor and via intake manifold 42 to the combustion chambers 48 formed by pistons 46 reciprocating within engine cylinders 44. Alternatively, tube 40 may connect to the air inlet tube 20 of the air filter 16. The interior of the partial vaporizer 30 is open to atmospheric air via an air passageway, indicated generally at 126.

Figure 2A:
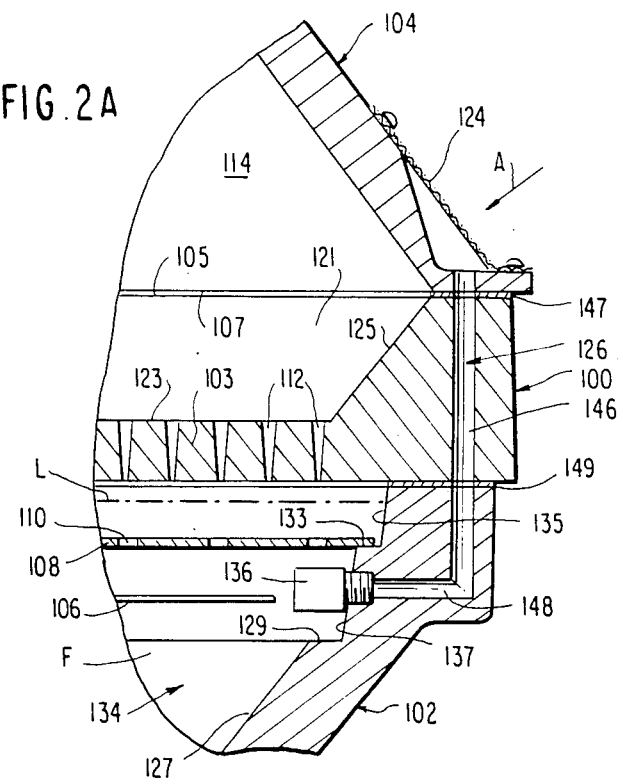
FIG. 2A is a fragmentary vertical section taken along line IIa—IIa of FIG. 4.
Figure 2:
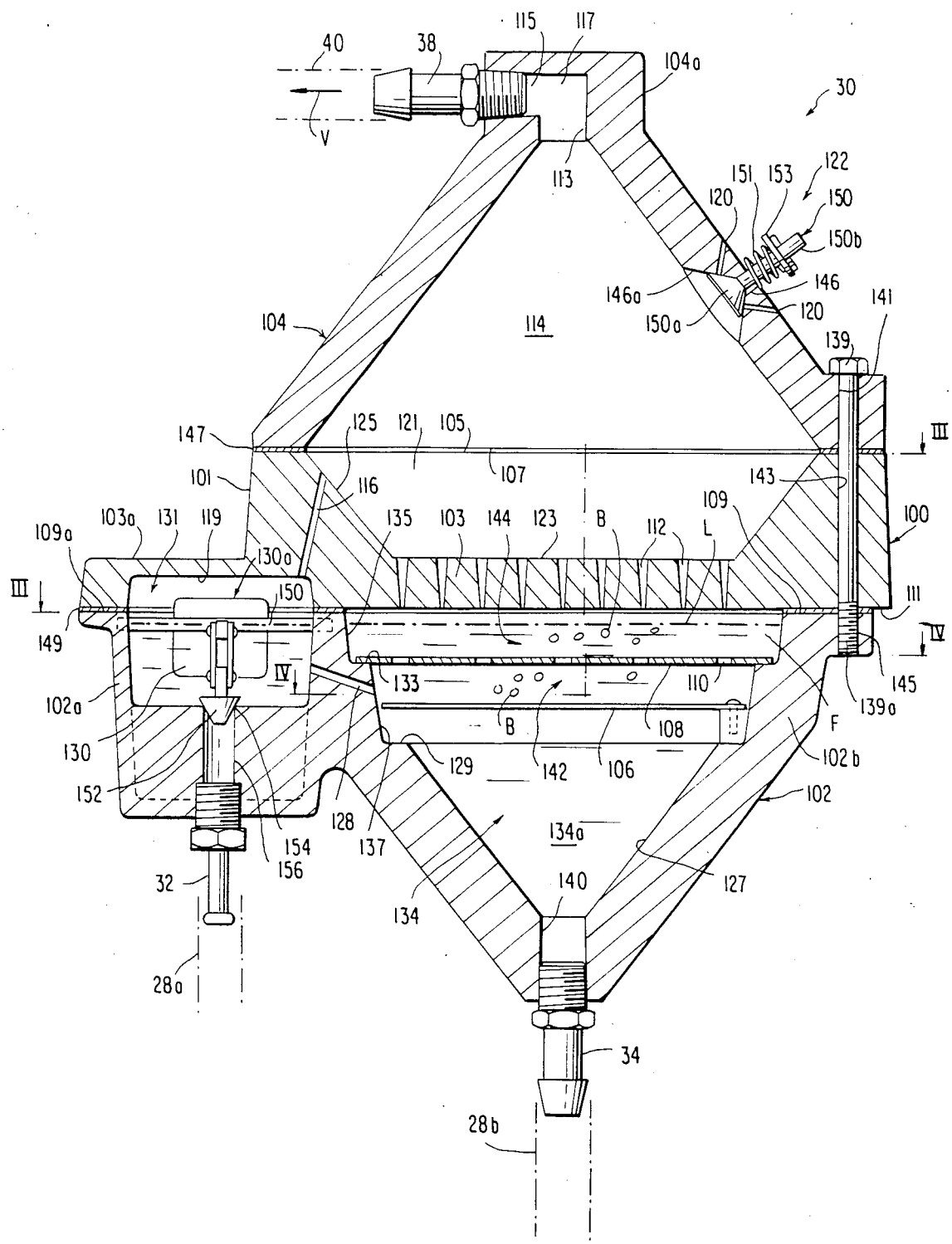
FIG. 2 is a vertical sectional view of the partial vaporizer forming a primary component of the split vapor/liquid fuel supply system of FIG. 1.
Figure 3:
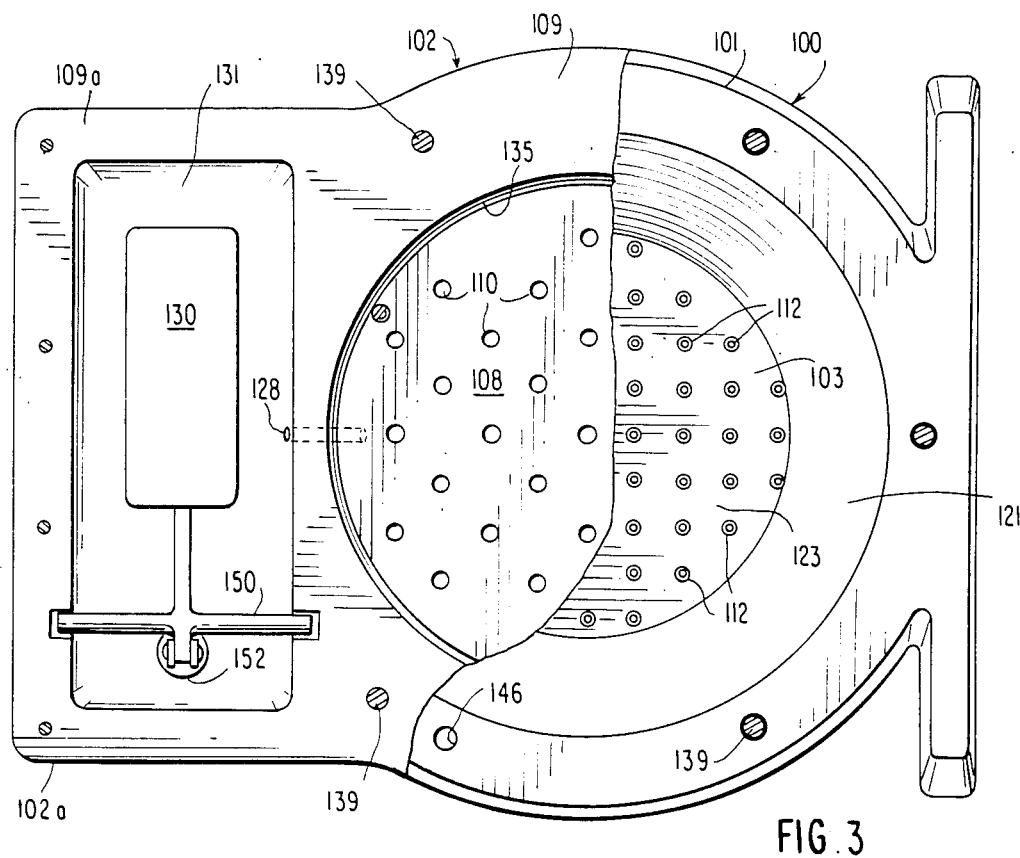
FIG. 3 is a horizontal sectional view of the partial vaporizer taken about line III—III of FIG. 2.
Figure 4:
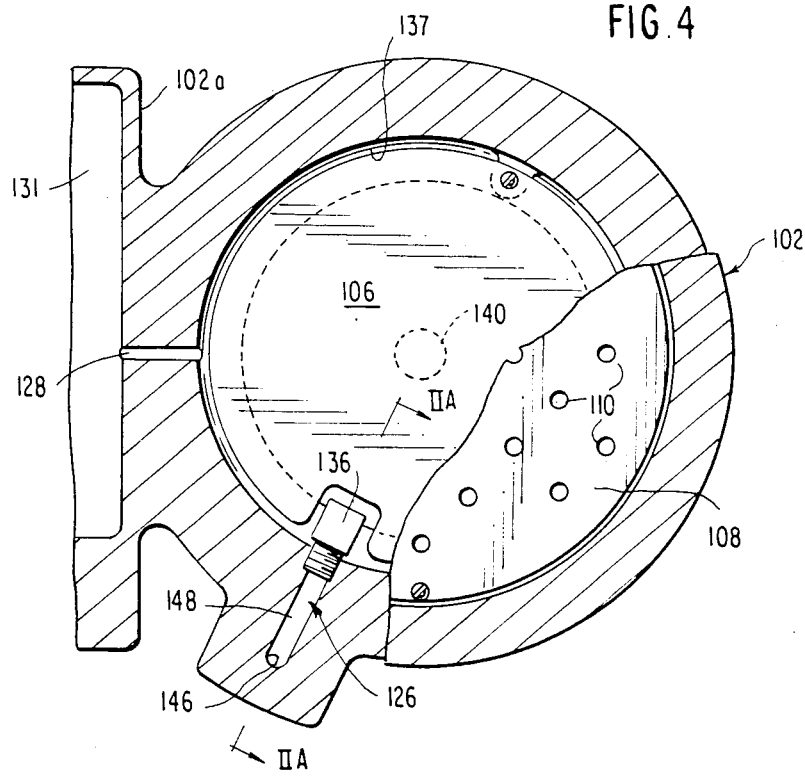
FIG. 4 is a horizontal sectional view of the partial vaporizer of FIG. 2 taken about line IV—IV.

Turning to FIGS. 2-4 inclusive it may be seen that, with respect to the major component of the system 10, partial vaporizer 30 is composed of a vertical stack of three major housing components, a central or intermediate main housing or heat transfer plate 100, a lower liquid fuel housing 102 and an upper fuel vapor expansion housing 104. The main housing or heat transfer plate 100 which necessarily is of a high heat conductive material may be of cast or machined aluminum, of modified circular disk form including a short vertical height cylindrical portion 101 extending upwardly from an integral, perforated plate portion 103. The plate portion 103 is extended to one side by a float chamber cover portion at 103a, which covers a float chamber 131 defined principally by portion 102a of the lower liquid fuel housing 102. The cylindrical portion 101 of the main housing or heat transfer plate 100 includes an annular face 105 which faces a matching annular face 107 of the upper vapor expansion housing 104. Housing 104 is of generally conical form and terminates at its apex in a cylindrical end cap 104a. While it is essential that the main housing or heat transfer plate 100 be formed of a high heat conductive material such as aluminum, it is preferred that the lower liquid fuel housing 102 and the upper housing 104 be formed of a thermal insulative material such as a ceramic. The lower liquid fuel housing 102 is of conical configuration and includes an annular upper face 109 which abuts the lower face 111 of the heat transfer plate portion 103 of the central component. In the illustrated embodiment, in addition to the main housing or heat transfer plate 100, the upper and lower housings are also formed of cast metal. In casting the main housing or heat transfer plate 100, a cavity 119 is cast or otherwise recess formed within the bottom of the float chamber portion 103a, while a frustoconical recess 121 is formed within the upper face of heat transfer plate 100, at the center thereof, defining a relatively thick perforated heat transfer plate portion 103. Heat transfer plate 100 carries a large number of tapered or otherwise varying diameter vertical holes 112 passing through the samne and which holes narrow downwardly in the direction of the bottom surface 111 of the main housing or heat transfer plate 100. Preferably the holes 112 are of conical form although they may be made by using decreasingly sized drill bits starting with a larger diameter drill bit from the top surface 123 of heat transfer plate portion 103 bearing holes 112 downwardly and decreasing the size of the drill bits employed and thus the diameter of drilled hole portions thereof. For instance, the upper third may be drilled using a No. 38 size drill, the center third being drilled with a No. 44 size drill bit, and the final (liquid fuel side) being drilled with a No. 53 size drill bit. In the nonperforated area of the heat transfer plate 100 and, outwardly of the same, outwardly oblique annular wall 125 lead from surface 123 to the annular face 105 of the main housing or heat transfer plate 100 which faces the lower annular face 107 of the conical upper vapor expansion housing 104.

In casting or otherwise forming the lower liquid fuel housing 102, the housing 102 is so cast as to form a conical main section 102b and, to the side thereof, an integral float chamber section or portion 102a, underlying the float chamber cover section 103a of the main housing or heat transfer plate 100. The annular upper face 111 of the main housing or heat transfer plate 100 and of the lower liquid fuel housing 102 is extended by the presence of the float chamber face section 109a, which mates with the lower surface 111 of the main housing or heat transfer plate 100. The cover portion 103a of the main housing and heat transfer plate 100 forms with the float chamber section 102a of the lower liquid fuel housing, float chamber 131. Chamber 131 is of generally horizontally elongated, rectangular form. Further, in casting or otherwise forming the lower liquid fuel housing 102, conical internal wall 127 defined liquid fuel chamber 134. Housing 102 is provided with a pair of radially enlarged recesses 135, 137, respectively, in the direction of the upper face 109 of that member, forming steps or annular ledges 129, 133, respectively. The steps 129, 133 form seats upon which rest, respectively, a circular disc form, barrier plate 106 and a perforated, air distribution plate 108. Alternatively a mesh screen, such as one of 200 mesh may be substituted for plate 106. Further, a vertically axially liquid fuel outlet hole 140 is drilled or otherwise formed within the bottom lower liquid fuel housing 102, at its conical apex, and mounts liquid fuel outlet fitting 34 connected to fuel line section 28b, FIG. 1, leading to the engine carburetor 18.

The stacked assembly of the lower liquid fuel housing 102, the main housing or heat transfer plate 100 and upper housing 104 may be achieved by the utilization of a series of assembly screws 139, at spaced circumferential postiions, which pass through smooth bores or holes 141 within the upper housing. 104, and 143 through the main housing or heat transfer plate 100 screws 139 terminate in threaded terminal ends 139a threadably received by taped holes 145 within the lower liquid fuel housing 102. Preferably, annular gaskets 147 and 149 are positioned, respectively, between the abutting faces 105, 107 of members 104 and 100; and annular face 109 of the lower liquid fuel housing 102 and the bottom face 111 of the main housing or heat transfer plate 100.

As shown in FIG. 2A, a vertically drilled hole 146 extends downwardly through the upper housing 104, the main housing or heat transfer plate 100 and to a certain extent within the lower liquid fuel housing 102, which hole 146 intersects a horizontal hole 148 opening to the liquid fuel chamber 134 below the surface level L of liquid fuel F nearly filling the liquid fuel chamber 134 within the lower liquid fuel housing 102. Holes 146 and 148 form air passageway 126. A check valve 136 is provided within passageway 126 to prevent fuel from exiting through holes 148, 146 to the outside but permitting ambient air to be drawn into the liquid fuel chamber 134 as a result of vacuum pressure being created within the vapor expansion chamber 114. As may be appreciated, the air passageway 126 may be formed by other than the right angle intersecting holes 146, 148 and it is not necessary that the air passage 126 extend through all three main components. It is only necessary that the air passageway 126 open internally beneath the liquid fuel level L within the lower liquid fuel housing 102 and that it open to the exterior, at some height above the level.

The liquid hydrocarbon fuel (gasoline) enters the float chamber 131 from fuel ine 28a as a result of operation of engine driven fuel pump 24. Float chamber 131 vents to vapor expansion chamber 114 via one or more holes 116 passing through plate 100. The float 130, forming a part of float valve 130a, pivots about a horizontal axis defined by an axle 150 and bears a vertically displaceable valve member 152 which moves toward and away from a valve orifice or annular valve seat 154, opening to a vertical outlet port 156 within which fuel inlet fitting 32 is sealably mounted. Fitting 32 connects to the fuel line section 28a. Thus, the liquid hydrocarbon fuel enters the chamber 131 and is maintained within a reasonable tolerance of level L within a bubble/liquid chamber section 144. Fuel completely fills the underlying air/liquid chamber section 142 of the liquid fuel chamber 134. By the utilization of ledges or steps 129, 133, the circular disc form barrier plate 106 and perforated air distribution plate 108 seat, respectively, thereon. Plate 108 may be screwed to ledge 133. The partial vaporizer 30 is so designed as to create a lowermost section 134a of chamber 134 for the accumulation of pure liquid fuel, an intermediate section 142 for creating large air bubbles B within the liquid fuel captured therein (between the overlying perforated air distribution plate 108 and the underlying imperforate barrier plate 106), and a thick bubble/liquid chamber section 144 wherein the bubbles of fuel captured air B escape from the liquid fuel above level L to contact the heat transfer plate portion 103 of the main housing 100. By the utilization of the three chambers sections therein, there is promoted the separation of the lighter fuel components or fractions of the liquid hydrocarbon fuel (gasoline) and their passage in vapor form to mix with the main stream of combustion air feeding to the carburetor and prior to its contact with the balance of the liquid fuel F fed via the liquid fuel outlet 140 to the carburetor.

It should also be noted that the air/liquid chamber section 142 is at the level where both the fuel F enters from the connected flow chamber 131 via transfer fuel feed passage 128 and wherein, a controlled amount of ambient air A, FIG. 2A, is drawn in through air passageway 126 by engine vacuum created within the air filter 16, FIG. 1, and which vacuum pressure is transferred to the vapor expansion chamber 114 via tube 40 connected therebetween.

The presence of the perforated air distribution plate 108 which is provided with a given number of openings or holes 110 to cause the air stream entering device 30 at check valve 136. FIG. 2A, to break up into air bubbles which pass upwardly through the liquid fuel for release from the liquid fuel surface level L. In the illustrated embodiment, plate 108 which may be formed of thin sheet metal such as aluminum, carries 24 holes in a random pattern of 3/32 inch diameter. By operation of the float 130, the fuel level L is maintained approximately ⅛ inch below the bottom surface 111 of the heat transfer plate 100 and within the bubble/liquid chamber section 144. This gap allows the fuel/air bubbles passing upwardly through the perforated air distribution palte 108 to reach their maximum expansion prior to bursting at the surface level L, thus causing a very thin film of fuel to come into contact with the heat transfer plate 100 at the small diameter holes 112 formed within the heat transfer plate portion 103 of that member. In the illustrated embodiment, there are 90 small diameter holes 112 which are randomly located in member 100 but with the holes being no closer to each other than 3/16 inch. The holes 112 diverge upwardly with their openings within surface 111 being, exemplary of .063 diameter. An air fuel mixture passes through the holes 112 subject to the heat of vaporization from plate 100 and the air fuel mixture in vapor form is encouraged to expand further by the diverge shape given to the lower portion of the vapor expansion chamber 114, i.e., recess 121 within the upper face of the main housing and heat transfer plate 100. If hydrocarbon fuel in liquid form passes through openings 112 which does not vaporize during that passage, such liquid fuel, in droplet form, will pass back into the bubble/liquid chamber section 144, through the openings or holes 112.

It may be appreciated the volume or flow rate of air A, FIG. 2A which is allowed to enter into and mix with the liquid fuel F within the air/liquid chamber section 142 is controlled by sizing of the air passageway 126, and/or check valve 136. For example, for use in a 305 swept displacement engine, the hole diameter of 126 would be restricted to ⅛ inch while for a 600 CI swept displacement engine, the diameter of the air passageway 126 (or the check valve 136 outlet) would be on the order of ¼ inch.

Further, a vapor outlet passage, indicated generally at 117, and defined by intersecting holes 113, 115 is sized accordingly, to limit the output flow of air/fuel vapor V. Correspondingly, for a 305 swept displacement engine, the outlet diameter of hole 115 may be on the order of ¼ inch, while for the 600 CI swept displacement engine, the outlet diameter may be limited to ⅜ inch.

Excess fuel vapor output will detract from the engine operation unless the liquid fuel flow is decreased accordingly for a standard carburetor fed internal combustion engine. Additionally, upon hard acceleration wherein a "shock" of high engine intake manifold vacuum pressure is applied to the expansion chamber 114, it is necessary to utilize a vacuum relief valve 122 to prevent liquid fuel from being drawn out of the vapor/air outlet 38 at that relatively high vacuum pressure. The upper housing 104 carries a pair of oblique air inlet holes 120 which open to a diverging conical bore portion 146a of bore 146 which bore 146 extends completely through the wall of the upper housing 104. Bore 146 supports a headed valve member 150 which is spring biased by an expansion coil spring 151. Coil spring 151 is compressed between a washer 153 fixed to the projecting end of the valve stem 150b of valve member 150 and the outside face of the upper housing 104 such that the enlarged conical valve head 150a of the valve 150 seats on the conical surface 146a to close off the paired air inlet holes 120.

In operation, the liquid hydrocarbon fuel pumped by the standard fuel pump 24 feeds to the float chamber 131 of the partial vaporizer or device 30. Within the device 30, liquid fuel flows from the float chamber 131, controlled by the float valve 130a, to maintain a given fuel level L within chamber 131 and bubble/liquid chamber section 144 at L as shown. The liquid fuel heavier components drain by gravity into chamber section 134a and passes via the liquid fuel outlet fitting 34 and fuel line section 28b to the standard carburetor 18, FIG. 1, (or thereto, via an added electric fuel pump). Upon starting of the engine, a vacuum pressure is created within the engine air filter chamber 16b, via the intake manifold 18, and that vacuum pressure is transferred via the vapor/air outlet line 40 to subject the interior of the expansion chamber 114, FIG. 2A to that below atmospheric pressure. The vacuum pressure acts to cause atmospheric air A to enter air passageway 126 through filter element 124, with check valve 136 opening, to cause air introduction into the body of fuel F below the surface level L of the fuel accumulating within the lower liquid fuel housing 102. The incoming air stream provides two important functions. The first is to thin the fuel as described, that is, to function to remove the fuel light components and, secondly, to act as a "carrier" for the light component vapors and to rapidly move them into the engine intake air, which would normally not occur due to the molecular weight of the hydrocarbon fuel.

Under engine idle conditions, very little movement occurs due to the minimal pressure drop produced in expansion chamber 114, but, as the engine throttle opening increases, an increasing vacuum pressure is produced in direct proportion to the throttle opening size. This results automatically in an increase or decrease of the volume of light component fuel vapor produced by the device and the flow rate of the same of the engine intake air within the air filter 16. In the preferred embodiment shown, the vapor/air line 40 from the device 30 attaches to the filter housing on the outside of the air filter element 16. In this manner, a greater degree of mixing is achieved by the fresh intake air and the air/vapor emanating from the expansion chamber 114 of the partial vaporizer 30 as they pass through the filter element 16 and into the carburetor 18. The filter element 16 also acts as a fire barrier should a malfunction of the engine occur and engine backfire. In some cases, it may be desirable to connect the outlet end of the vapor/air line 40 to the filter housing 16a at a point radially inside of the filter element 16 wherein a greater distance of vacuum pressure exists. If this is the case, a fire stop (not shown) may be required. A fire stop may constitute a simple stainless steel mesh screen in the 200 strand per inch range, which is large enough in size to prevent its being a restriction to flow. Such screens have an open area of approximately 33% and, via proper calculation, appropriate sizing can be determined to ensure the proper ratio of air and air vapor flow mixture prior to entering the engine carburetor 18.

In the vapor state, the mixture V, shown by arrow, FIG. 2 is no longer subject to damage by high temperature within the intake manifold 42 or combustion chamber. The presence of the air/vapor mixture V creates a more rapid spread of the flame front of ignition occurring within the combustion chamber, thus allowing more of the liquid fuel which enters the combustion chamber in fine particle form within this combined air/air vapor stream to convert to vapor in the fractional time period allotted of the power stroke and in turn to develop propulsive (gas pressure) energy as a result of combustion. When properly sized and installed, the split fuel supply system of the present invention accomplishes a major lowering of exhaust pollutants.

To further assist the mixing of fuel and air and to add increased vaporization for the lighter components or fractions of the liquid hydrocarbon fuel, the invention contemplates placement of one or more manifold inserts 160 in standard openings of conventional internal combustion engine intake manifolds 42. Such inserts 160 cause a static disruption to the flows leaving the carburetor venturi. Modestly heated by the intake manifold 42, the liquid fuel coming into contact with the insert is given the opportunity to pick up additional heat of vaporization to vaporize any lighter elements or components of the hydrocarbon fuel still remaining. Additionally, the static distribution causes the air to mix to a greater degree than could otherwise be expected, offering the hydrocrbon molecules the opportunity to take on more of the oxygen atoms needed for proper combustion. Test results show an added 2 to nearly 3 miles per gallon when incorporated within the fuel supply system as described hereinbefore on a 1984 GMC 8-cylinder truck and a 1979 Chrysler New Yorker, thus roughly a 16% increase in fuel economy. Materials utilized for such inserts are required to be heat transferable such as aluminum of TEFLON-coated copper (bare copper deters gasoline vaporization). Additionally, the vapor/air outlet line 40 is required to be of a material that does not deter vapor flow and is slippery relative to this flow to allow unimpeded flow of the vapor from the expansion chamber 114 to the engine air filter housing 16a. In this respect, rubber lines are unsatisfactory.

From the above description, it is readily apparent that due to the inherent nature of the lighter components of gasoline to readily vaporize at any ambient temperature, the split vapor/liquid fuel supply system of the present invention is highly desirable in gaining increased fuel economy at minimal cost and expense and is applicable to the highly controlled carburetors and ignition systems utilized in today's automotive vehicle industry. Due to the time factors in standard carburetor systems combined with the high flow velocities involved, there is a considerable limit both in terms of achieving vaporization of the fuel and its ability to combine with combustion oxygen prior to the power stroke of the engine. Applicant's theory involves the utilization of vapors in relatively small quantities from the partial vaporizer 30 to "tinder" the intake air 22 which modestly changes the speed at which combustion occurs, which results in added power output per stroke with the end result being less fuel required for a given engine performance.

While the invention has been illustrated in terms of a partial vaporizer having a relatively large number of components, the partial vaporizer itself may be simplified and some of the components eliminated while still obtaining most of the desired effects and to a significantly high degree of worthwhile fuel economy, while achieving increased power output of the engine incorporating such fuel supply systems. However, the lower liquid fuel chamber 134 appears to be an absolute necessity to eliminate air-saturated fuel from leaving the device and delivery to the standard carburetor. The function of the barrier plate 106 which is imperforate (without significant passage therethrough) and is normally sized of a diameter slightly smaller than the diameter of the recess 135 bearing the same so as to permit a somewhat loose floating within the liquid fuel chamber 134 and fuel passage about the periphery thereof seeking outlet at 140, is to isolate the lower liquid fuel chamber section 134a from the intermediate air/liquid chamber section 142, within which the air percolates. The perforated air distribution plate 108 could be eliminated and the device would still function, although to a slightly lesser degree than that described. Further, the air input location, i.e., the terminus of passage 126 at check valve 136, may be varied but must be at some point below the surface level L of the liquid fuel so as to cause the necessary bubbling action. Heat may be added to the ambient air flow within air passageway 126. However, it is not seen that a large benefit will be experienced by preheating the air. Most of the desired separation of the lighter components of the liquid hydrocarbon fuel from the balance of such fuel, the carrying of the lighter components by the air bubbles and in turn the breakdown of the bubbles and the mixing of the air and fuel in vapor form is achieved by the main housing or heat transfer plate 100. Holes 112 which could be of a fixed diameter and not increase in diameter in a direction away from the liquid fuel chamber 134 would provide a useful function, although it is believed that the action would produce less conversion of fuel. On smaller engines, such an arrangement may be adequate.

The liquid fuel level L should be maintained fairly close to the bottom surface 111 of the heat transfer plate 100, although some variation may be permitted without adversely affecting the system operation. in the production of the favorable results documented, the sizes given for the inlet or input air passageway 126 and that of the output or outlet passage 113 for the vapor/air mixture must be kept within reasonable tolerances. Either an excess or too little fuel vapor relative to the air bearing same in mixture form will detract from the overall results achieved by the exemplary system shown. The vacuum pressure relief valve or system 122 is of necessity to ensure that no liquid fuel is pulled from the device on hard acceleration and, while shown as located in the upper housing and opening to the chamber 114, it may be located where the vapor/air outlet line 40 connects to the air filter housing 16a. The frustoconical shape given to the expansion cavity 121 within the main housing or heat transfer plate 100 and the conical shapes given to the upper and lower housings, coupled thereto, may be varied. However, it has been found that the utilization of the shapes illustrated is highly desirable due to their effect on the flows experienced, thus eliminating the normal exit of liquid from the chamber which could materially affect the favorable action in joining the vapor/air line flow of lighter components to the main intake air 22 passing through the air filter 16 prior to mixing with fine particles of liquid fuel at the carburetor.

The heat transfer plate 100 may obviously be made from material other than that of aluminum, as long as it is capable of transferring sufficient heat from the ambient air. Aluminum has been found to be very practical, but mild steel may be utilized if coated to prevent rust. Further, the heat transfer plate 100 may be fitted with fins to speed up heat transfer.

While the invention has been described in detail and with reference to specific embodiments thereof, it will be apparent to one skilled in the art that changes and modifications may be made thereto without departing fromthe spirit and scope of the invention.

What is claimed is:

1. A split vapor/liquid fuel supply system for an internal combustion engine having: an intake manifold leading to at least one combustion chamber, a fuel tank holding a liquid hydrocarbon fuel supply, a carburetor connected to the fuel supply for feeding fuel to the engine, air supply means for supplying engine intake air to the carburetor for mixing with the fuel, the improvement comprising: a partial fuel vaporizer connected intermediate of the fuel tank and the carburetor, the partial fuel vaporizer including a housing defining a lower liquid fuel chamber, an upper vapor expansion chamber and a heat transfer plate separating said chambers and having small diameter holes therethrough, means for maintaining liquid hydrocarbon fuel within said liquid fuel chamber at a level beneath said perforated heat transfer plate, means for permitting ambient air to enter said liquid fuel chamber beneath the level of said liquid fuel therein for percolation therethrough, means connecting the vapor expansion chamber to the air supply means of the carburetor, upstream of the carburetor whereby light hydrocarbon fuel components in vapor form are created by vacuum pressure within the vapor expansion chamber causing air to enter the liquid fuel chamber and percolate therethrough and to expand bubbles of air passing through the heat transfer plate bearing fuel in vapor form for mixing with the main intake air stream prior to its passage through the carburetor to provide an increased time factor of air/fuel mixing with the result being less liquid fuel needed by the engine, an inrease in the speed of the flame front within the combustion chamber, an increase in portions of the fuel burned during the power stroke of the engine and less fuel waste during the engine exhaust stroke.

2. The fuel system as claimed in claim 1, wherein said partial vaporizer comprises a three-part housing including a lower liquid fuel housing, an upper vapor expansion chamber housing and a perforated heat transfer plate positioned between the upper and lower housings and forming a vertically stacked array, said upper and lower housings comprising hollow members sealed at their peripheries to respective faces of the heat transfer plate.

3. The fuel system as claimed in claim 1, wherein said housing includes a float chamber, a fuel intake line connects the fuel tank to the float chamber, and means are provided within said float chamber for controlling flow of fuel from said fuel intake line into the float chamber, such that the liquid fuel is maintained at said level within said lower liquid fuel chamber just below the perforated heat transfer plate.

4. The fuel system as claimed in claim 1, wherein said means for feeding air to the liquid fuel chamber below the level of liquid fuel therein comprises an air passageway within said housing opening at one end to the atmosphere above the liquid fuel elvel within the liquid fuel chamber and opening to the interior of the liquid fuel chamber below the level of accumulated liquid fuel therein, and a check valve is positioned within said air passageway to prevent liquid fuel or vapor from escaping from said liquid fuel chamber to the exterior of said partial vaporizer.

5. The system as claimed in claim 4, further comprising a perforated air distribution member fixedly mounted within said lower liquid fuel chamber above the level of the opening of the air passageway thereto, a vapor/air extractor barrier within said liquid fuel chamber beneath said perforated air distribution plate and at a level below the opening of the air passageway, such that an air/liquid chamber section is formed between said extractor barrier and the perforated air distribution palte so that relatively large air bubbles are formed within said liquid fuel accumulating within said liquid fuel chamber for percolation through the bubble/liquid chamber section and for escape through said perforated air distribution plate, and wherein said air bubbles expand within said bubble/liquid chamber defined by said perforated air distribution plate in said heat transfer plate to small amounts of said fuel to impinge against said heat transfer plate and to escape through the holes passing therethrough for further expansion within said expansion chamber and to form an vapor/air mixture for passage to said air filter.

6. The fuel system as claimed inclaim 5, further comprising a vacuum relief valve provided within the upper housing for selectively permitting atmospheric air to enter the vapor expansion chamber undery very high engine air intake pressure conditions to prevent liquid fuel from escaping through said vapor expansion chamber to said air filter.

7. The fuel system as claimed in claim 2, wherein said upper and lower liquid fuel housings of conical shape to facilitate the expansion of air and vapor mixtures entering the vapor expansion chamber and concentration of liquid fuel within said upper chamber and lower chamber, respectively.

8. The fuel system as claimed in claim 2, wherein said perforated heat transfer plate holes passing therethrough constitute vertical holes of expanding size in the direction leasing from the bubble/liquid chamber section to the vapor expansion chamber.

9. The fuel system as claimed in claim 2, wherein said heat transfer plate is formed of a high thermal conductivity metal, and wherein said upper and lower housing forming said chambers is formed of a thermal insulative material.

10. The fuel system as claimed in claim 1, further comprising at least one manifold insert within the internal combustion engine intake manifold for causing liquid fuel coming into contact therewith from the carburetor to pick up additional heat of vaporization therefrom for vaporizing any lighter components of the liquid hydrocarbon fuel still remaining in liquid form prior to entering the combustion chamber.

11. The fuel system as claimed in claim 10, wherein said at least one insert comprises one material of the group consisting of aluminum and TEFLON-coated copper.

* * * * *